Figure 1:
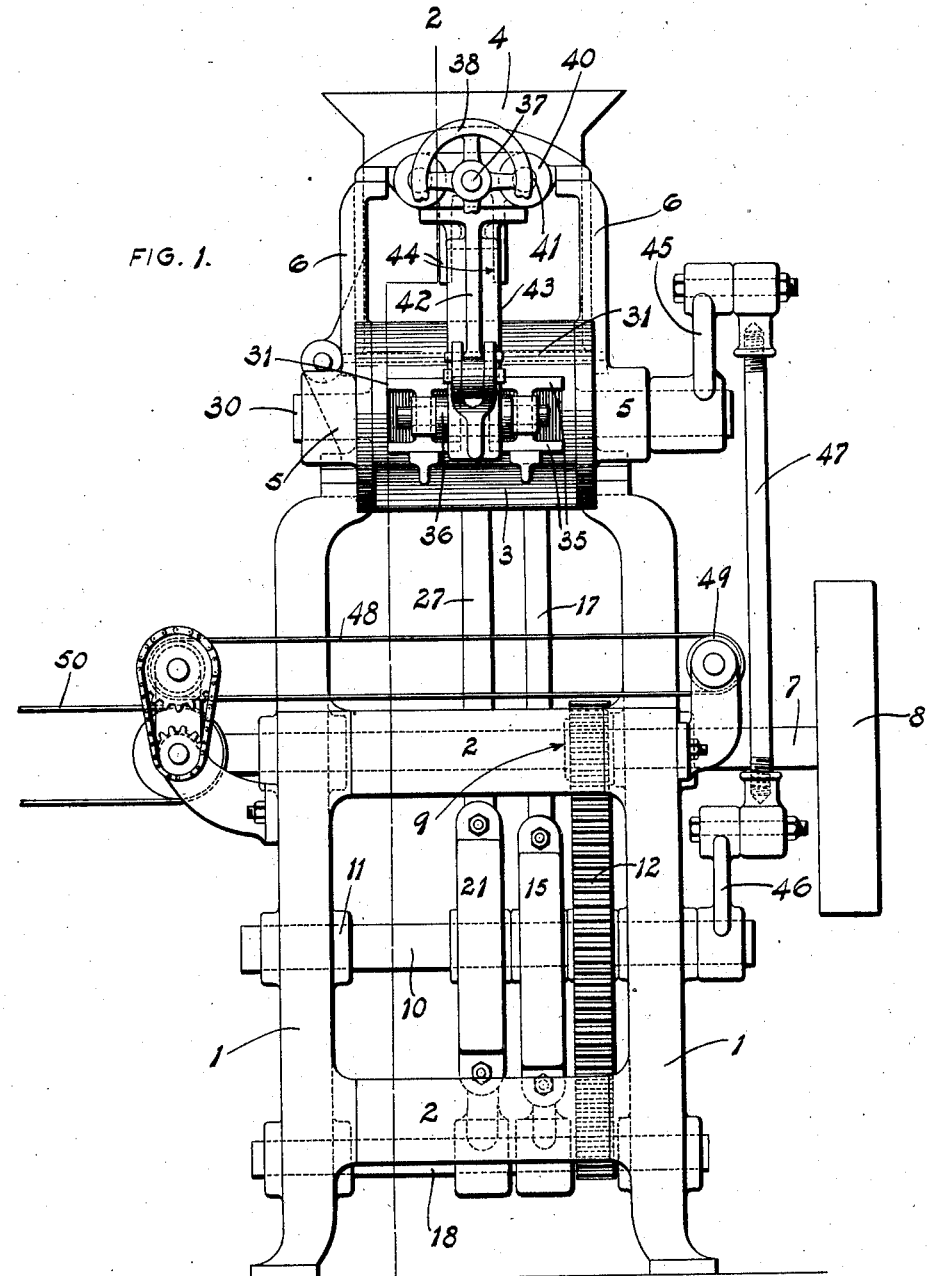

F. STREICH.
DOUGH DIVIDING MACHINE.
APPLICATION FILED APR. 20, 1910.

1,003,543.

Patented Sept. 19, 1911.
2 SHEETS—SHEET 1.

WITNESSES

INVENTOR
FRANK STREICH

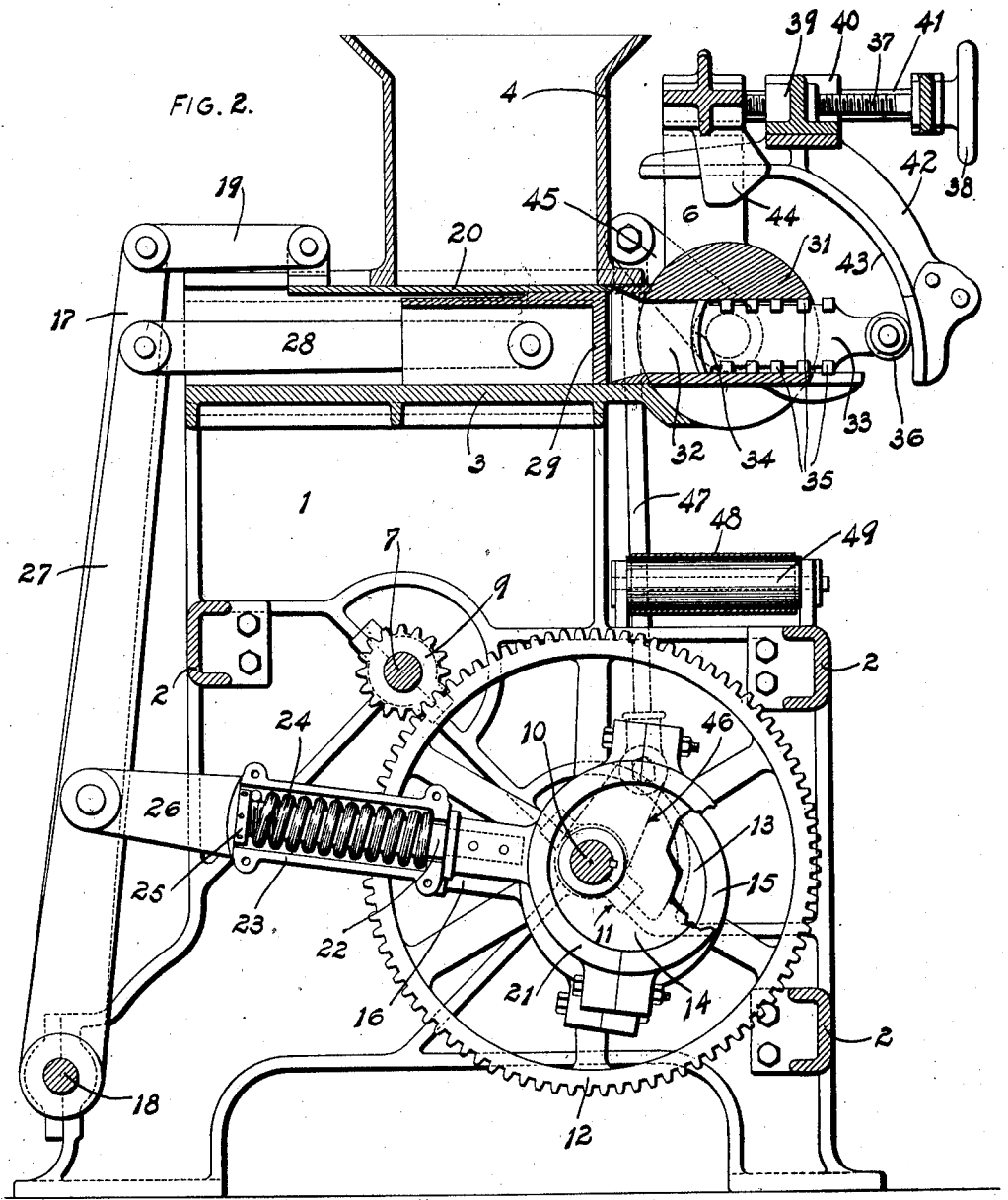

UNITED STATES PATENT OFFICE.

FRANK STREICH, OF ST. LOUIS, MISSOURI, ASSIGNOR TO AMERICAN BAKERS' MACHINERY COMPANY, OF ST. LOUIS, MISSOURI, A CORPORATION OF MISSOURI.

DOUGH-DIVIDING MACHINE.

1,003,543.  Specification of Letters Patent.  Patented Sept. 19, 1911.

Application filed April 20, 1910. Serial No. 556,589.

*To all whom it may concern:*

Be it known that I, FRANK STREICH, a citizen of the United States, residing at St. Louis, Missouri, have invented a certain new and useful Improvement in Dough-Dividing Machines, of which the following is a full, clear, and exact description, such as will enable others skilled in the art to which it appertains to make and use the same, reference being had to the accompanying drawings, forming part of this specification, in which—

Figure 1 is an end elevation of a dough dividing machine of my improved construction. Fig. 2 is a vertical section taken on the line 2—2 of Fig. 1.

My invention relates to a machine for dividing a large mass of dough into lumps or portions of uniform size and weight, which lumps or portions are afterward formed into loaves.

The principal objects of my invention are: first, to provide a simple machine which will readily perform the work of dividing dough into lumps of uniform size and weight; second, to provide a dough dividing machine with adjustable means whereby the size and consequently the weight of said lumps of dough can be varied; third, to provide means for automatically discharging the lump of dough after the same has been pressed into the pocket which regulates the size of the lumps; fourth, to provide a yielding connection in one of the rods utilized in the plunger operating mechanism which connection permits the plunger to stop in case an excess amount of dough is fed into the lump forming pocket; and fifth, to provide means for drawing the dough from the hopper into the forming pocket by means of suction due to the reverse or rearward movement of the plunger.

To the above purpose my invention consists in certain novel features of construction and arrangement of parts hereinafter more fully described and claimed.

In the construction of my improved machine I utilize a pair of side frames 1, framed together by suitable cross braces 2, and fixed in the upper portion of this framework is a horizontally disposed trough 3 surmounted by a hopper 4. Formed on or fixed to the frame immediately in front of the trough 3 is a pair of bearings 5 and formed on or fixed thereto is an inverted U-shaped frame or arch 6.

Journaled in suitable bearings at the approximate center of the frame of the machine is the main driving shaft 7, which is preferably operated by means of a belt passing around a pulley 8. Fixed on the outer end of said shaft 7 and mounted on said shaft adjacent one end of the side frames 1 is a pinion 9.

A counter shaft 10 is journaled in suitable bearings 11 formed on the side frame 1 below and in front of the bearings occupied by the shaft 7, and fixed on this shaft 10 is a large gear wheel 12 which meshes with and is driven by the pinion 9.

Fixed on the shaft 10 adjacent the gear wheel 9 is a pair of eccentric disks 13 and 14, the same being arranged so that the disk 13 is slightly in advance of the disk 14. Encircling the disk 13 is a strap 15 which is connected to an arm 16, which latter extends rearward, and is pivotally connected to a vertically disposed lever 17. The lower end of this lever is loosely mounted on a shaft 18 which latter is supported in suitable bearings on the rear sides and lower ends of the frames 1.

The lever 17 extends upward to a point just above the rear portion of the trough 3 and pivotally connected to the upper end of said lever 17 is a link 19, the forward end of which is pivotally connected to the rear end of a plate 20. This plate is adapted to slide horizontally above the trough 3 and across the lower end of the hopper 4, and the forward end of said plate is sharpened or provided with a knife edge in order to cut off the dough which passes into the forward portion of the trough from the hopper 4.

Encircling the disk 14 is a strap 21 and fixed thereto is a rearwardly projecting rod 22. This rod occupies a housing 23, and located upon said rod is a comparatively heavy expansive coil spring 24. One end of this coil spring bears against one of the ends of the housing 23, and the opposite end bears against a nut 25 carried by the threaded outer end of the rod 22. This nut provides means for adjusting the tension of the spring 24.

Formed on or fixed to the housing 23 is a rearwardly projecting arm 26 which is pivotally connected to a vertically disposed lever 27. The lower end of this lever is journaled on the shaft 18, and pivotally connected to the upper end of said lever is the rear end of a horizontally disposed link 28, which projects forward through the trough 4.

29 designates a plunger which is arranged to slide through the trough 3 immediately below the knife 20, and the forward end of the link 28 is pivotally connected to this plunger.

Journaled in the bearings 5 are the trunnions 30 of a circular head 31 through the center of which is formed an opening 32. This opening 32 forms a pocket into which the dough is pressed to form the lump of proper size and weight, and arranged to slide freely through this opening is a block 33 on the forward end of which is formed a plate or head 34.

Formed on the top and bottom of the block 33 is a series of horizontally disposed ribs 35 which serve as scrapers to cut out and remove any dough which may be squeezed past the plate or head 34. Carried by the outer end of the block 33 is a roller 36.

Journaled in the upper end of the arch 6 is the rear end of a horizontally disposed screw threaded rod 37 on the forward end of which is an operating wheel 38. This rod 37 passes through a threaded aperture formed in a block 39, and formed integral with the sides of said block are heads 40, which slide upon rods 41 seated in the arch 6.

Rigidly fixed to the under side of the block 39 and depending therefrom is a curved bracket 42 on the under side of which is formed a track 43 against which the roller 36 is adapted to bear. The curved portion of the track 43 is eccentric to the axis of the circular head 31, and when said head is rotated a quarter of a turn so as to bring the block 33 into an approximate vertical position the roller 36 bearing against said track will cause the block to move downward through the opening in the circular head thus effecting a discharge of the dough which has been pressed into the pocket in the circular head.

Formed on or fixed to the under side of the arch 6 is a bracket 44 against which the roller 36 is adapted to engage when the rotary head 31 is turned so as to move the block 33 into a vertical position and thus said block 34 acts as a cam to move the block 33 entirely through the opening 32, thereby discharging the lump of dough beneath the head or plate 34.

Fixed to one of the trunnions 30 is the lower end of a crank arm 45, and fixed on the corresponding end of the shaft 10 is a shorter crank arm 46. Connecting the outer ends of the crank arm 45 and 46 is a connecting rod 47, and these crank arms and projecting rod are so arranged as to impart a rocking motion of approximately a quarter of a complete revolution to the rotary head 31.

48 designates an endless conveyer in the form of a belt operating on suitable rollers 49, which conveyer is located immediately beneath the circular head 31, and said endless conveyer discharges onto a second endless conveyer 50.

The operation of my improved dough-dividing machine is as follows: The shaft 7 being driven imparts rotary motion to the shaft 10 by reason of the gears 9 and 12, and the eccentrics 13 and 14 on the shaft 10 impart reciprocating motion to the arms 16 and 26, and consequently the levers 17 and 27 are moved backward and forward. The hopper 4 is filled with dough, and during the time the plunger 29 and the plate 20 are drawn rearward, that portion of the trough 3 below the hopper 4 is filled with dough, and the rearward movement of the plunger 29 through the trough creates a certain amount of suction, which draws the dough from the hopper into the trough. The plate 20 moves forward between the trough and hopper, thereby cutting off the dough in the trough, and the plunger 29 follows the plate closely and packs the dough into the pocket formed by the opening 32 in the head 31. If for any reason an excess amount of dough should be forced into the pocket, the plunger will stop and the spring 24 will be compressed by the continued movement of the eccentric 14. Thus the yielding connection between the rod 22 and arm 26 provides means for preventing breakage of any of the parts whenever an excess amount of dough is forced into the pocket. When the dough has thus been forced into the pocket by the plunger, the head 31 is rocked by the action of the cranks 45 and 46 which are connected by the rod 47, and said head is moved so that the opening 32 is brought into an approximately vertical position, during which time the roller 36 bears against the track 43 until said roller engages against the bracket 44. As a result of such engagement the block 33 is moved downward through the opening 32, thereby discharging the lump of dough pressed into the pocket in the head, and which lump of dough drops onto the endless conveyer 48 and is delivered thereby to the second conveyer. During the rearward movement of the plunger 29, the head 31 is partially rotated to bring the opening 32 into alinement with the trough 3, and when the plunger 29 is again moved forward, the dough forced into the pocket moves the block 33 rearward until the roller 36 engages against the lower portion of the track 43, which, in this instance, forms a stop to limit the outward movement of the block 33. The curved bracket 42 can be moved backward or forward by rotating the threaded rod 37, and thus the distance of outward movement of the block 33 can be adjusted, which adjustment regulates the size of the pocket in the head 31 into which the dough is pressed. It will be readily understood that this adjustment regulates the size and consequently the weight of the lumps of dough discharged from the head 31, and which lumps are later formed into loaves.

A dough-dividing machine of my improved construction is comparatively simple, can be operated with little power, very rapidly divides a mass of dough into lumps of uniform size and weight, and said machine is provided with simple means which can be readily adjusted to regulate the size and consequent weight of the lumps of dough.

It will be readily understood that minor changes in the form and construction of the various parts of my improved dough-dividing machine can be made and substituted for those herein shown and described, without departing from the spirit of my invention.

I claim:

1. In a machine of the class described, a trough, a head having a pocket adapted to receive dough from the trough, a plunger operating through the trough, a lever connected to the plunger for operating the same, an arm connected to said lever, a second arm connected to an operating means, and resilient means connecting said arms.

2. In a machine of the class described, a trough adapted to receive dough from a hopper, a plunger operating therein, means for imparting a sliding movement to said plunger, comprising a two-part arm, and resilient means connecting said two parts of the arm.

3. In a machine of the class described, a trough, a head having a pocket adapted to receive dough from the trough, a plunger operating through the trough, a lever connected to the plunger for operating the same, an arm connected to said lever having a housing therein, a rod connected to an operating means and passing through said housing, and a spring surrounding the rod engaging the housing at one end and a projecting part of the rod at the other.

4. In a machine of the class described, a rotating head adapted to receive dough, a block arranged to slide through the opening in said head, and a series of cleaning ribs on said block.

5. In a machine of the class described, a rotating head adapted to receive dough, a block arranged to slide through the opening in said head, a series of cleaning ribs on said block, and means for limiting the outward movement of the block, due to the pressure of the dough against said block.

6. In a machine of the class described, a rotating head adapted to receive dough under pressure, a block arranged to slide through the opening in said head, a series of cleaning ribs on said block, and adjustable means for limiting the outward movement of the block, due to the pressure of the dough against said block.

In testimony whereof I hereunto affix my signature in the presence of two witnesses, this 14th day of April, 1910.

FRANK STREICH.

Witnesses:
M. P. SMITH,
B. S. REID.